United States Patent
Zheng et al.

(10) Patent No.: US 12,236,645 B2
(45) Date of Patent: Feb. 25, 2025

(54) METHOD, DEVICE, AND STORAGE MEDIUM FOR DATA ENCODING/DECODING

(71) Applicants: SZ DJI TECHNOLOGY CO., LTD., Shenzhen (CN); ZHEJIANG UNIVERSITY, Hangzhou (CN)

(72) Inventors: Xiaozhen Zheng, Shenzhen (CN); Pu Li, Shenzhen (CN); Jiafeng Chen, Hangzhou (CN); Wenyi Wang, Hangzhou (CN); Lu Yu, Hangzhou (CN)

(73) Assignees: SZ DJI TECHNOLOGY CO., LTD., Shenzhen (CN); ZHEJIANG UNIVERSITY, Hangzhou (CN)

( * ) Notice: Subject to any disclaimer, the term of this patent is extended or adjusted under 35 U.S.C. 154(b) by 442 days.

(21) Appl. No.: 17/571,238

(22) Filed: Jan. 7, 2022

(65) Prior Publication Data

US 2022/0130074 A1  Apr. 28, 2022

Related U.S. Application Data

(63) Continuation of application No. PCT/CN2019/095508, filed on Jul. 10, 2019.

(51) Int. Cl.
G06T 9/00 (2006.01)

(52) U.S. Cl.
CPC ..................... *G06T 9/00* (2013.01)

(58) Field of Classification Search
CPC ........................................ G06T 9/00
See application file for complete search history.

(56) References Cited

U.S. PATENT DOCUMENTS

| | | | |
|---|---|---|---|
| 2019/0081638 A1 | 3/2019 | Mammou et al. | |
| 2019/0116357 A1 | 4/2019 | Tian et al. | |
| 2020/0314435 A1* | 10/2020 | Tourapis | G06T 7/74 |

FOREIGN PATENT DOCUMENTS

| | | |
|---|---|---|
| CN | 103136535 A | 6/2013 |
| CN | 108833927 A | 11/2018 |
| CN | 109166160 A | 1/2019 |
| CN | 109257604 A | 1/2019 |
| CN | 109889840 A | 6/2019 |
| WO | 2019073939 A1 | 4/2019 |

OTHER PUBLICATIONS

The World Intellectual Property Organization (WIPO) International Search Report for PCT/CN2019/095508 Apr. 8, 2020 6 Pages (including translation).

* cited by examiner

*Primary Examiner* — David F Dunphy
(74) *Attorney, Agent, or Firm* — ANOVA LAW GROUP, PLLC

(57) ABSTRACT

A data encoding method includes determining a value of a syntax element of point cloud data of a point cloud. The point cloud data includes attribute values of the point cloud and the syntax element indicates a search range of the attribute values during prediction encoding. The method further includes performing prediction processing on the attribute values according to the search range to obtain residuals of the attribute values, and encoding the residuals and a difference between the value of the syntax element and a constant value to generate code stream data. The constant value is a positive number.

18 Claims, 4 Drawing Sheets

METHOD, DEVICE, AND STORAGE MEDIUM FOR DATA ENCODING/DECODING

CROSS-REFERENCE TO RELATED APPLICATION

This application is a continuation of International Application No. PCT/CN2019/095508, filed Jul. 10, 2019, the entire content of which is incorporated herein by reference.

TECHNICAL FIELD

The present disclosure relates to the field of data encoding/decoding and, more particularly, to a method, a device, and a storage medium for data encoding/decoding.

BACKGROUND

Point cloud data can be obtained by collection using lidars or laser scanners. Point cloud data is a form of expression of a three-dimensional object or a three-dimensional scene, and includes a set of discrete points that are randomly distributed in space. The set of discrete points expresses the spatial structure and surface properties of the three-dimensional object or the three-dimensional scene. To accurately reflect the information in the space, the number of discrete points required is huge. To reduce the storage space and the bandwidth occupied during transmission of a point cloud, the point cloud needs to be encoded and compressed. Data of a point cloud may include three-dimensional coordinates (x, y, z) describing coordinate information, and attribute information of the position such as reflectivity or color (R, G, B). A process for encoding the point cloud data include position encoding and attribute encoding of the point cloud data. The attribute encoding of the point cloud data needs to be improved.

SUMMARY

In accordance with the disclosure, there is provided a data encoding method including determining a value of a syntax element of point cloud data of a point cloud. The point cloud data includes attribute values of the point cloud and the syntax element indicates a search range of the attribute values during prediction encoding. The method further includes performing prediction processing on the attribute values according to the search range to obtain residuals of the attribute values, and encoding the residuals and a difference between the value of the syntax element and a constant value to generate code stream data. The constant value is a positive number.

In accordance with the disclosure, there is also provided a data decoding method including decoding a value of a syntax element of point cloud data of a point cloud from code stream data. The point cloud data includes attribute values of the point cloud, and the syntax element indicates a search range of the attribute values during prediction decoding. The method further includes determining the search range of the attribute values during prediction encoding according to a sum of the value of the syntax element and a constant value that is a positive number, obtaining residuals of the attribute values from the code stream data by decoding, and performing compensation processing on the residuals according to the search range.

In accordance with the disclosure, there is also provided a data encoding device including a memory and a processor. The memory stores a programs. The processor is configured to execute the program to determine a value of a syntax element of point cloud data of a point cloud. The point cloud data includes attribute values of the point cloud and the syntax element indicating a search range of the attribute values during prediction encoding. The processor is further configured to execute the program to perform prediction processing on the attribute values according to the search range to obtain residuals of the attribute values, and encode the residuals and a difference between the value of the syntax element and a constant value to generate code stream data. The constant value is a positive number.

DETAILED DESCRIPTION OF THE EMBODIMENTS

The technical solutions in the embodiments of the present disclosure will be described below in conjunction with the drawings in the embodiments of the present disclosure. Obviously, the described embodiments are some of the embodiments of the present disclosure, but not all of the embodiments. Based on the embodiments in this disclosure, all other embodiments obtained by those of ordinary skill in the art without creative work shall fall within the scope of this disclosure.

Unless otherwise specified, all technical and scientific terms used in the embodiments of the present disclosure have the same meaning as commonly understood by those skilled in the technical field of the present disclosure. The terms used in this disclosure are only for the purpose of describing specific embodiments, and are not intended to limit the scope of the present disclosure.

An attribute encoding process has high complexity. The present disclosure provides a data encoding method for encoding attribute values of point cloud data and a corresponding decoding method.

Figure 1:
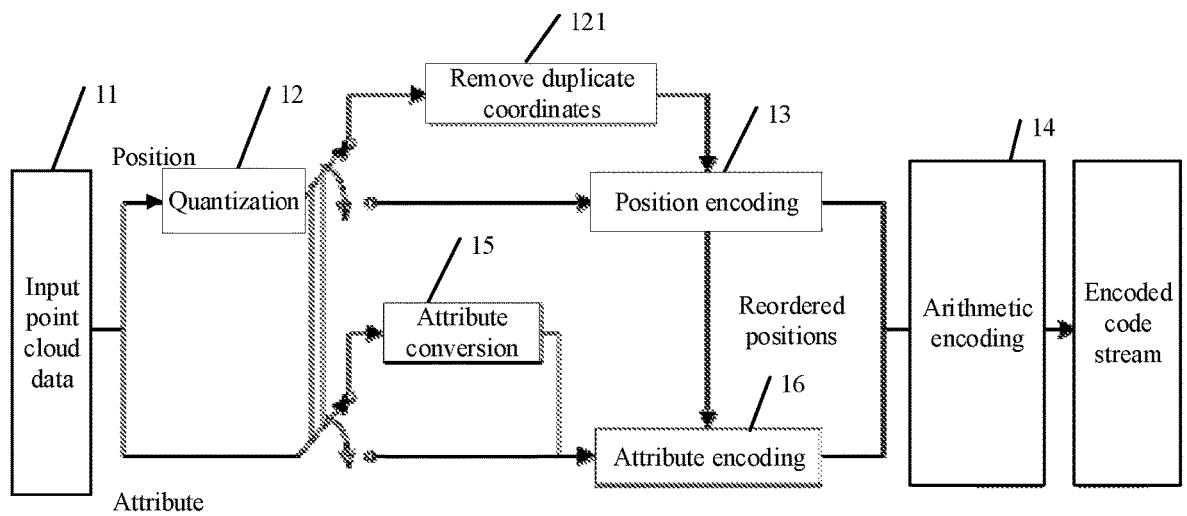
FIG. 1 is a schematic flow chart of a data encoding process consistent with the present disclosure.

In some embodiments, quantization may be first performed on attribute values of point cloud data to be encoded. FIG. 1 is a schematic flow chart of a data encoding process provided by various embodiments of the present disclosure. As shown in FIG. 1, the point cloud data is input in 11, and the position coordinates of the input point cloud data are quantized in 12. Optionally, duplicated coordinates in the position coordinates quantized in 12 are removed in 121. Position encoding 13 is performed on the processed position coordinates and the results are transmitted to an arithmetic encoding engine for arithmetic encoding 16. For attribute values of the input point cloud data, if it is selected to remove the duplicated coordinates according to the position coordinates in 121, attribute conversion 15 is performed to merge attribute values corresponding to merged position coordinates; while if the duplicated coordinates are not removed in 121, attribute conversion is not performed. Then, attribute encoding 16 is sequentially performed on the attribute values according to the order of the position coordinates after the position encoding 13.

In one embodiment, a prediction encoding scheme based on sorting code is a method for encoding the attribute values of the point cloud data. In an example, in the prediction encoding scheme based on the sorting code, the sorting code corresponding to each position coordinate may be calculated according to the position coordinates of the point cloud data. After the sorting code corresponding to each position coordinate is obtained, point cloud points in the point cloud data may be sorted according to the magnitude relationship of the sorting codes, and prediction encoding may be performed on the attribute values of the sorted point cloud data to obtain the residual of the attribute value of each point cloud point in the point cloud data. In the sorted point cloud, the positions of the point cloud points that are ranked close in the three-dimensional space may be also relatively close. Since the attribute values of the point cloud points with similar positions in the three-dimensional space are more likely to be similar, performing prediction processing on the sorted point cloud data may reduce the bits consumed by the residuals of the attribute values of the point cloud data. A sorting code refers to a method of sorting three-dimensional space points according to a certain rule, which may be Morton code, Euclidean distance (distance-based ordering), and so on.

Therefore, there may be a high probability that multiple zeros may appear in the residuals of the attribute values of the point cloud. In one embodiment, when encoding the residuals, for the current point cloud point, identifier 1 may be first encoded. Identifier 1 may be used to indicate whether there are multiple consecutive zeros in the residuals of the attribute values of the point cloud, and a number of the consecutive 0's. For example, when the number of point cloud points consecutively having a residual of 0 is greater than or equal to 1 (that is, when there are one or more consecutive point cloud points having a residual of 0), the value of identifier 1 may be set to the number of consecutive 0's; and when 0 does not appear, the value of identifier 1 may be set to 0.

When identifier 1 is used to indicate that there is no point cloud point with a residual of 0 currently, identifier 2 may be encoded, and identifier 2 may be used to indicate whether the value of the residual of the current point cloud point minus 1 is 0. For example, when the value of the residual minus 1 is 0, the value of identifier 2 may be set to 1. When the value of the residual of the current point cloud point minus 1 is not 0, the specific value of the residual may be encoded; or, when the value of the residual of the current point cloud point minus 1 is not 0, identifier 3 may then be encoded. Identifier 3 may be used to indicate whether the value of the residual of the current point cloud point minus 2 is 0, and when the value of the residual of the current point cloud point minus 2 is not 0, the specific value of the residual may then be encoded. For example, when the value of the residual of the current point cloud point minus 2 is 0, the value of identifier 3 may be set to 1; when the value of the residual of the current point cloud point minus 2 is not 0, the value of identifier 3 may be set to 0, and the specific value of the residual may then be encoded. Optionally, when identifier 3 indicates that the residual of the current point cloud point is not 2, identifier 4 may then be encoded to indicate whether the value of the residual of the current point cloud point minus 3 is 0.

In some embodiments, the prediction encoding may be performed on the attribute values of the sorted point cloud, and the residual of the attribute value of each point cloud point in the obtained point cloud may be positive or negative. When the residual of the attribute value of each point cloud point in the obtained point cloud is a signed number, the residual of the attribute value of the point cloud point may be sign converted according to a preset rule, that is, may be converted from a signed number to an unsigned number. For example, assuming that the residual of the attribute value of the point cloud point is −1, the residual −1 of the attribute value of the point cloud point may be converted to 1 according to the preset rule −1−(2*(−1)). For another example, assuming that the residual of the attribute value of the point cloud point is 1, the residual of the attribute value of the point cloud point may be converted to 2 according to the preset rule 2*1. Of course, in other embodiments, sign conversion may not be performed on the residuals of the attribute values of the point cloud, which is not specifically limited here.

In some embodiments, when the prediction encoding is performed on the attribute values of the sorted point cloud, a corresponding search range may be determined in the sorted point cloud according to a value of a syntax element lifting_search_range, and a reference point cloud point of the current point cloud point may be determined from the point cloud points in the search range. According to the attribute value of the reference point cloud point and the attribute value of the current point cloud point, the residual of the current point cloud point may be determined.

When encoding the point cloud data, the residual of each point cloud point and the value of the syntax element lifting_search_range may be written into the code stream. In an example, the value of lifting_search_range may be fixed to a value not less than a constant value. The constant value may be a positive number, for example, it may be 1. Before writing the value of lifting_search_range into the code stream, the constant value may be subtracted from the value of lifting_search_range, and the obtained difference may be written into the code stream. Correspondingly, the number of bits consumed by lifting_search_range may be reduced. Further, the value of lifting_search_range may be fixed to a value not less than the constant value, and the scheme where lifting_search_range has a value of 0 may be removed from the encoding scheme. Unlike the scheme where the value of lifting_search_range is greater than 0, in the scheme where the value of lifting_search_range is 0, there may be no need to fetch the residual of each point cloud point in the point cloud data, but the attribute value of the point cloud point itself may be binarized directly. Therefore, by eliminating the scheme where the value of lifting_search_range is 0, the encoding complexity may be reduced.

Figure 2:
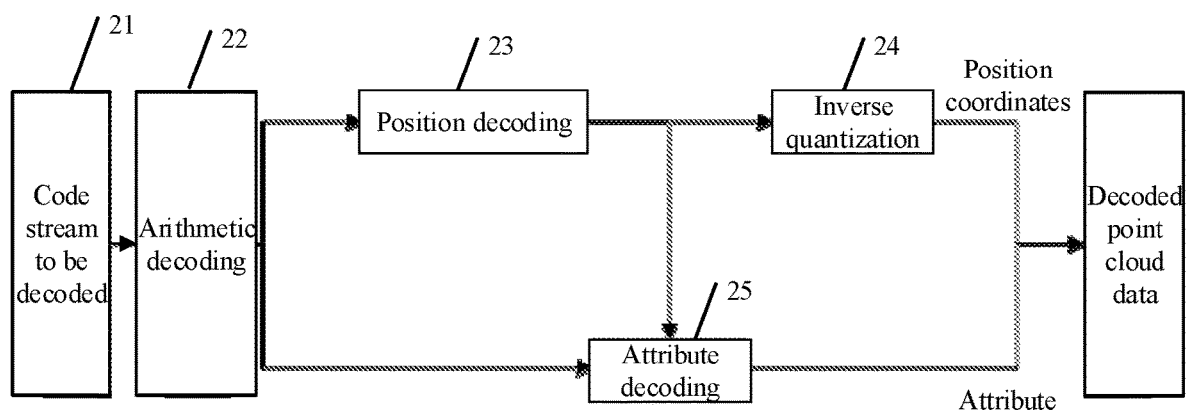
FIG. 2 is a schematic flow chart of a data decoding process consistent with the present disclosure.

One embodiment of the present disclosure also provides a data decoding method corresponding to the above encoding method. As shown in FIG. 2, arithmetic decoding 22 is performed on an input code stream to be decoded 21, to decode the code stream related to the position information. By position decoding 23 and inverse quantization 24, reconstructed position coordinates may be obtained. Correspondingly, attribute values of the point cloud may be decoded and obtained by attribute decoding 25 according to an order of the position coordinates obtained by position decoding 23.

In one embodiment, the prediction decoding scheme based on the sorting code may be a method of attribute decoding of the point cloud data. In one example, the value of the syntax element lifting_search_range of the point cloud data and the residual of the attribute value of each point cloud point may be decoded from the code stream data.

Optionally, the sorting code corresponding to each position coordinate may be calculated first according to the position coordinates of the point cloud data. After the sorting code corresponding to each position coordinate is obtained, the point cloud points in the point cloud may be sorted according to the magnitude relationship of the sorting codes. After decoding the code stream data, the residual of the attribute value of each point cloud point in the point cloud may be corresponding to the sorted point cloud points.

When decoding the residual of the attribute value of the current point cloud point, whether the residual of the attribute value of the current point cloud point is 0 and a number of the point cloud points that consecutively have a residual of 0 (that is, a number of consecutive point cloud points whose residual of attribute value is 0) may be determined according to the value of identifier 1 in the code stream data. For example, when it is decoded that the value of identifier 1 is not 0, it is determined according to the specific value of identifier 1 that the number of point cloud points consecutively having a residual of 0 in the sorted point cloud from the current point cloud point.

Optionally, when the value of identifier 1 is decoded to be 0, it may be determined that the residual of the attribute value of the current point cloud point is not 0, and the specific value of the residual is continued to be decoded. Or, when it is determined that the residual of the attribute value of the current point cloud point is not 0, the value of identifier 2 may be continuously decoded from the code stream, and it may be determined whether the residual of the attribute value of the current point cloud point is 1 according to the value of identifier 2. For example, when the value of identifier 2 is decoded to be 1, it may be determined that the residual of the attribute value of the current point cloud point is 1. When the value of identifier 2 is decoded to be 0, it may be determined that the residual of the attribute value of the current point cloud point is not 1, and the specific value of the residual of the attribute value of the current point cloud point attribute may be continuously decoded or the value of identifier 3 may be continuously decoded from the code stream to determine whether the residual of the attribute of the current point cloud point is 2 according to the value of identifier 3. When the decoded value of identifier 3 is 1, it may be determined that the residual of the attribute value of the current point cloud point is 2. When the decoded value of identifier 3 is 0, it may be determined that the residual of the attribute value of the current point cloud point is not 2, and then the specific value of the residual of the attribute value of the current point cloud point attribute may be continuously decoded.

After decoding the residual of the attribute value of each point cloud point in the sorted point cloud, compensation processing may be performed on the residuals according to the value of the syntax element lifting_search_range, to determine the attribute value of each point cloud point in the sorted point cloud. Specifically, after the value of lifting_search_range is decoded from the code stream data, the sum of the value of lifting_search_range and a constant value may be used as the actual search range to perform compensation processing on the residual.

The data encoding and decoding method provided by various embodiments of the present disclosure will be described in detail below with references to the drawings.

Figure 3:
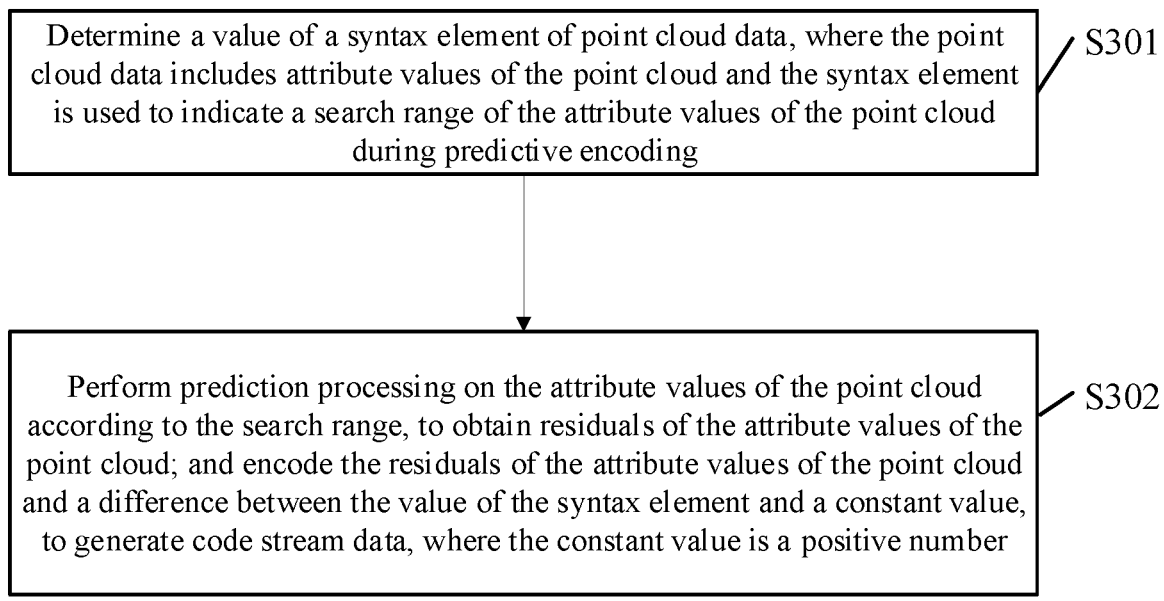
FIG. 3 is a schematic flow chart of a data encoding method consistent with the present disclosure.

FIG. 3 is a flow chart of a data encoding method provided by one embodiment of the present disclosure. The method may be applied to a data encoding device. The data encoding device may be provided at a smart terminal (such as a mobile phone, a tablet computer, etc.). In some other embodiments, the method may also be applied to an aircraft (such as an unmanned aerial vehicle). In some other embodiments, the method may also be applied to other movable platforms (such as unmanned ships, unmanned automobiles, robots, etc.). The present disclosure has no limit on this. As shown in FIG. 3, the method includes S310 and S302.

At S301: a value of a syntax element of point cloud data is determined. The point cloud data may include attribute values of the point cloud, and the syntax element may be used to indicate a search range of the attribute values of the point cloud during prediction encoding.

The point cloud data may include the attribute values of the point cloud, and the syntax element may be used to indicate the search range of the attribute value of the point cloud during prediction encoding. For example, the syntax element may be the syntax element lifting_search_range mentioned above. In one embodiment of the present disclosure, the algorithm for determining the value of the syntax element used to indicate the search range may use an algorithm in an existing calculation, which will not be repeated here.

In some embodiments, the point cloud data may be obtained through one or more collection devices. In some embodiments, the collection devices may include, but are not limited to, imaging devices, lidars, laser scanners, or other equipment.

In some embodiments, a lidar may be a perceptual sensor capable of obtaining three-dimensional information of a scene. A basic principle of the lidar may include: actively emitting laser pulse signals to an object to be detected and obtaining reflected pulse signals. According to the time difference between the transmitted signals and the received signals, depth information of the distance between the object to be detected and the sensor may be calculated. Based on the known transmitting direction of the lidar, angle information of the object to be detected relative to the lidar may be obtained. By combining the aforementioned depth information and angle information, a large number of detection points (called point cloud data) may be obtained. In some embodiments, the reflectivity of each point to be detected may also be obtained or color information of each point to be detected may be obtained in combination with other sensors. The position information of each point cloud point may be the position information of each point cloud point in a three-dimensional space, and may include the aforementioned depth information and angle information. The attribute value of each point cloud point may include the reflectivity and/or color information of each point cloud point.

At S302, prediction processing is performed on the attribute values of the point cloud according to the search range, to obtain residuals of the attribute values of the point cloud. The residuals of the attribute values of the point cloud, and a difference between the value of the syntax element and a constant value, are encoded, to generate code stream data. The constant value may be a positive number.

The data encoding device may perform prediction processing on the attribute values of the point cloud to obtain the residuals of the attribute values of the point cloud, and encode the residuals of the attribute values of the point cloud to obtain the code stream data. The code stream data may include identification information, and the identification information may be used to indicate that the residual of the attribute value of at least one point cloud point is zero. For example, the identification information may include at least one of identifier 1, identifier 2, or identifier 3 mentioned above.

Before writing the syntax element into the code stream, since the value of the syntax element is fixed to a value not less than a constant value, the difference obtained after subtracting the constant value from the value of the syntax element may be written into the code stream instead of the syntax element. Optionally, the constant value may be 1.

In one embodiment, before the data encoding device performs prediction processing on the attribute values of the point cloud, it may calculate the sorting code corresponding to the position coordinates of the point cloud points in the point cloud, and then sort the point cloud points in the point cloud according to the sorting code of the point cloud points. In some embodiments, when the data encoding device performs prediction processing on the attribute values of the point cloud, the prediction processing may be performed on the attribute values of the point cloud according to the order of the point cloud points in the point cloud and the search range.

In one embodiment, when the data encoding device performs prediction processing on the attribute values of the point cloud according to the order of the point cloud points in the point cloud and the search range, it may determine a reference point cloud point of the current point cloud point, where an order difference between the reference point cloud point and the current point cloud point in the sorted point cloud may be not greater than the search range. According to the attribute value of the reference point cloud point and the attribute value of the current point cloud, the residual of the attribute value of the current point cloud point may be calculated.

In some embodiments, the data encoding device may determine the residual of the attribute value of the current point cloud point according to the attribute value of the reference point cloud point and the attribute value of the current point cloud point. The difference between the attribute value of the reference point cloud point and the attribute value of the current point cloud point may be determined as the residual of the attribute value of the current point cloud point.

In one embodiment, assuming that the search range corresponding to the value of the syntax element is 3, when the data encoding device performs the prediction processing on the attribute values of the point cloud according to the order of the point cloud points in the point cloud and the search range, it may determine three reference point cloud points that are adjacent to the current point cloud point and before the current point cloud point. The order difference between the three reference point cloud points and the current point cloud point may be not greater than the search range 3 in the sorted point cloud. After determining the three reference point cloud points of the current point cloud point, the data encoding device may calculate the residual of the attribute value of the current point cloud point according to the difference between the attribute values of the three reference point cloud points and the attribute value of the current point cloud point.

In one embodiment, the identification information may include a first identifier, and the first identifier may be used to indicate the number of point cloud points consecutively having a residual of attribute value of 0. For example, assuming that the first identifier has a value of 5, it may be determined that there are 5 point cloud points consecutively having a residual of attribute value of 0. In one embodiment, the first identifier may be identifier 1 mentioned above.

In one embodiment, the identification information may include a second identifier, and the second identifier may be used to indicate whether the residual of the attribute value of the current point cloud point is n, where n is a positive integer. In some embodiments, n may be 1 or 2. In some embodiments, the second identifier may be specifically used to indicate whether the difference between the residual of the attribute value of the current point cloud point and n is zero. For example, the second identifier may include identifier 2 and/or identifier 3 mentioned above. In an example, the identification information may include a first identifier and a second identifier.

In one embodiment, the data encoding device may also perform sign conversion on the residuals of the attribute values of the point cloud before encoding the residuals of the attribute values of the point cloud to obtain bitstream data. Then, the point cloud may be encoded to obtain the code stream data according to the residuals of the attribute values of the point cloud after sign conversion.

In the present embodiment of the present disclosure, by fixing the search range to the value not less than the constant value, solutions with the search range less than or equal to the constant value may be removed, including the solution of removing the direct binary encoding of the attribute values of the point cloud itself. Further, when encoding the value of the syntax element indicating the value of the search range, the difference value after subtracting the constant value from the value of the syntax element may be written into the code stream. Through this implementation, the algorithm complexity of encoding the attribute values may be greatly simplified and reduced. Time overhead and the efficiency of attribute encoding may be improved. Also, the number of bits occupied by the syntax element may be reduced in some cases.

Figure 4:
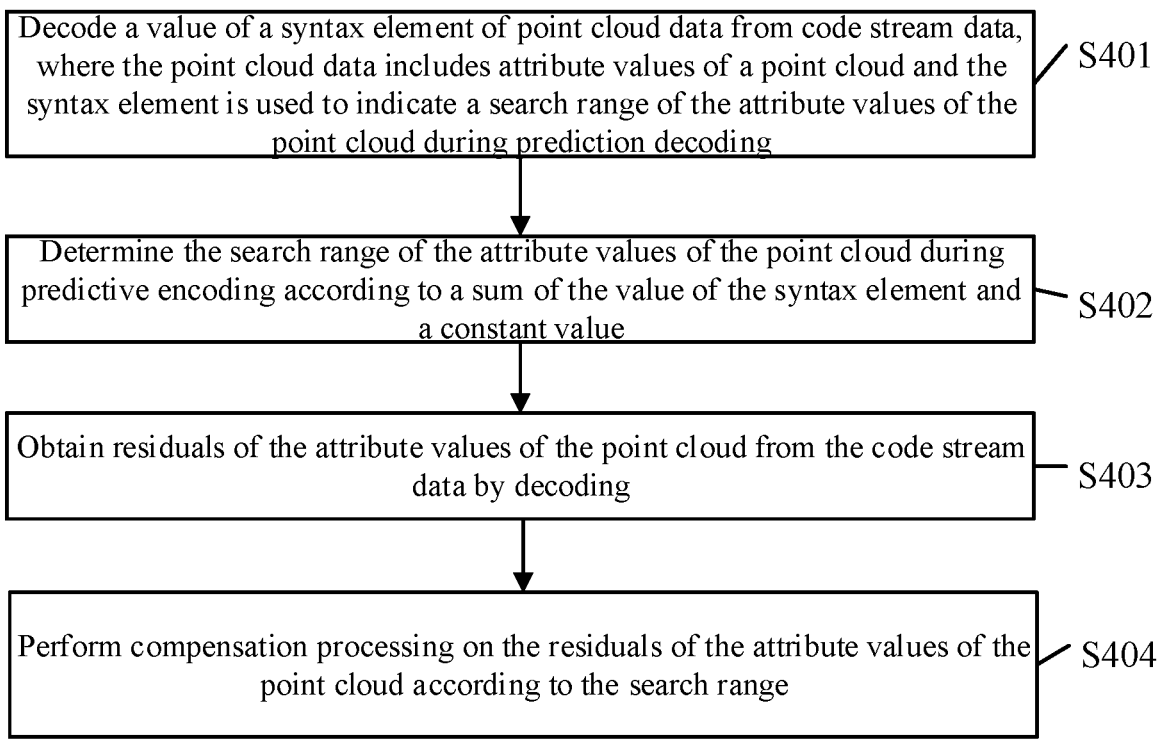
FIG. 4 is a schematic flow chart of a data decoding method consistent with the present disclosure.

FIG. 4 is a flow chart of a data decoding method provided by an embodiment of the present disclosure. The data decoding method may be applied to a data decoding device. The data decoding device may be provided at a smart terminal (such as a mobile phone, a tablet computer, etc.). As shown in FIG. 4, the method includes S401 to S404.

At S401: the value of the syntax element of the point cloud data is decoded from the code stream data. The point cloud data includes the attribute values of the point cloud, and the syntax element is used to indicate the search range of the attribute values of the point cloud when the prediction processing is performed.

In one embodiment, the data decoding device may decode the value of the syntax element of the point cloud data from the code stream data. The point cloud data may include the attribute values of the point cloud, and the syntax element may be used to indicate the value of the search range of the attribute values during prediction decoding. In some embodiments, the syntax element may be the aforementioned lifting_search_range. In other embodiments, the syntax element may also include other expression forms, which are not specifically limited here.

At S402: the search range of the attribute values of the point cloud during the prediction encoding is determined according to the sum of the value of the syntax element and the constant value.

After the value of the syntax element is decoded from the code stream data, the value may be added to the constant value, and the sum obtained may be used as the value of the actual search range. The constant value may be a positive number. Optionally, the constant value may be 1. Optionally, the value of the syntax element may be configured to a constant value not less than the constant value.

At S403, the residuals of the attribute values of the point cloud are obtained by decoding the code stream data.

Optionally, the code stream data may include identification information, and the identification information may be used to indicate that the residual of the attribute value of at least one point cloud point is zero. The identification information may include a first identification and/or a second identification. For the explanation of the first identification and the second identification, please see the above description.

At S404, compensation processing is performed on the residuals of the attribute values of the point cloud according to the search range.

In one embodiment, optionally, before the decoding device performs compensation processing on the residuals of the attribute values of the point cloud, the sorting code corresponding to the position coordinates of the point cloud points in the point cloud may be calculated, and the point cloud points in the point cloud may be sorted according to the sorting code of the point cloud points in the point cloud. In one embodiment, when the data decoding device performs compensation processing on the residuals of the attribute values of the point cloud, the compensation processing may be performed on the residuals of the attribute values of the point cloud according to the order of the point cloud points in the point cloud and the search range.

In one embodiment, when the data decoding device performs compensation processing on the residuals of the attribute values of the point cloud according to the order of the point cloud points in the point cloud and the search range, a reference point cloud point of the current point cloud point may be determined according to the search range, where an order difference between the reference point cloud point and the current point cloud point in the sorted point cloud may be not greater than the search range. According to the residual of the attribute value of the current point cloud point and the attribute value of the reference point cloud point, the attribute value of the current point cloud point may be determined.

In some embodiments, when the data decoding device determines the attribute value of the current point cloud point according to the residual of the attribute value of the current point cloud point and the attribute value of the reference point cloud point, the attribute value of the current point cloud point may be determined according to the difference between the residual of the attribute value of the current point cloud point and the attribute value of the reference point cloud point.

For example, assuming that the search range is 3, the point cloud points in the point cloud include D1, D2, D3, D4, D5, D6, and the order of the point cloud points is D2, D4, D5, D1, D6, D3, when the current point cloud point is D2, the data decoding device may determine that the reference point cloud point of the current point cloud point D2 to be D5 from D2, D4, and D5 before the current point cloud point D2, according to the search range of 3. The order difference between the reference point cloud points D2, D4, D5 and the current point cloud point D2 in the sorted point cloud may be not greater than the search range 3. The data decoding device may determine the attribute value of the current point cloud point D2 according to the difference between the attribute value of the reference point cloud point D5 and the residual of the attribute value of the current point cloud point D2.

In one embodiment, when it is determined that the search range is not 0 according to the value of the syntax element, before performing compensation processing on the residuals of the attribute values of the point cloud, the data decoding device may further perform sign conversion on the residuals of the attribute values of the point cloud. In some embodiments, the specific implementation and examples of the sign conversion of the residuals of the attribute values of the point cloud may be similar to the description above, and will not be repeated here. In one embodiment, after the data decoding device performs sign conversion on the residuals of the attribute values of the point cloud, it may perform compensation processing on the residuals of the attribute values of the point cloud according to the residuals of the attribute values after sign conversion.

Figure 5:
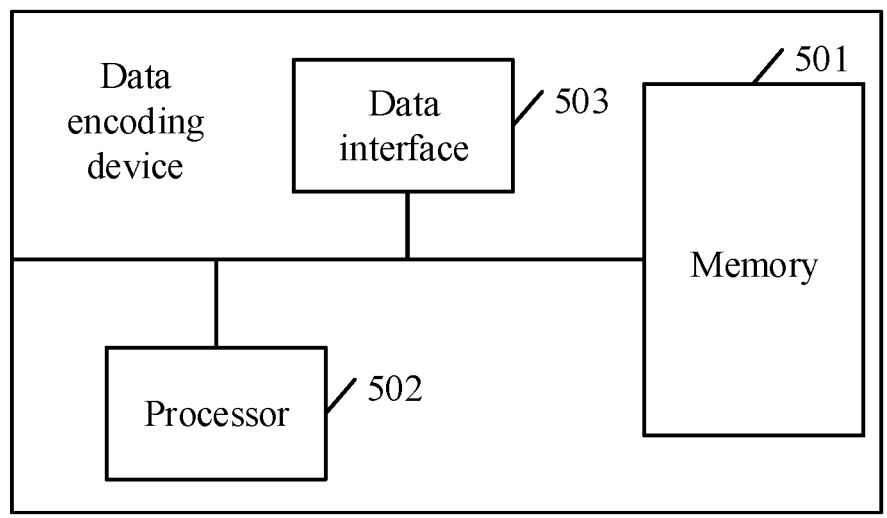
FIG. 5 is a schematic block diagram of a data encoding device consistent with the present disclosure.

The present disclosure also provides a data encoding device. In one embodiment shown in FIG. 5, the data encoding device includes a memory 501, a processor 502, and a data interface 503.

The memory 501 may include a volatile memory. The memory 501 may also include a non-volatile memory. The memory 501 may also include a combination of a volatile memory or a non-volatile memory. The processor 502 may be a central processing unit (CPU). The processor 502 may further include a hardware data encoding device. The hardware data encoding device may be an application-specific integrated circuit (ASIC), a programmable logic device (PLD), or a combination thereof. For example, it may be a complex programmable logic device (CPLD), a field-programmable gate array (FPGA), or any combination thereof.

The memory 501 may be configured to store programs. When the programs are executed, the processor 502 may be configured to call the programs stored in the memory 501 to:

determine a value of a syntax element of point cloud data, where the point cloud data includes the attribute values of the point cloud and the syntax element is used to indicate a search range of the attribute values of the point cloud during prediction encoding;

perform prediction processing on the attribute values of the point cloud according to the search range, to obtain the residuals of the attribute values of the point cloud; and encode the residuals of the attribute values of the point cloud and a difference between the value of the syntax element and a constant value, to generate code stream data, where the constant value is a positive number.

Optionally, the point cloud data may further include position coordinates of the point cloud.

Before the prediction processing on the attribute values of the point cloud, the processor may be further configured to:

calculate a sorting code corresponding to the position coordinates of the point cloud points in the point cloud; and sort the point cloud points in the point cloud according to the sorting code of the point cloud points in the point cloud.

Performing prediction processing on the attribute values of the point cloud may include:

according to the order of the point cloud points in the point cloud and the search range, performing prediction processing on the attribute values of the point cloud.

Optionally, performing prediction processing on the attribute values of the point cloud according to the order of the point cloud points in the point cloud and the search range may include:

determining a reference point cloud point of a current point cloud point, where the order difference between the reference point cloud point and the current point cloud point in the sorted point cloud is not greater than the search range; and according to the attribute value of the reference point cloud point and the attribute value of the current point cloud point, calculating a residual of the attribute value of the point cloud point.

Optionally, the code stream data may include a first identifier, and the first identifier may be used to indicate the number of point cloud points consecutively having a residual of attribute value of 0.

Optionally, the code stream data may include a second identifier, and the second identifier may be used to indicate whether the residual of the attribute value of the current point cloud point is n, where n is a positive integer. Optionally, n may be 1 or 2.

Optionally, the second identifier may be specifically used to indicate whether the difference between the residual of the attribute value of the current point cloud point and n is zero.

Optionally, before encoding the residuals of the attribute values of the point cloud, the processor may be further configured to:

perform sign conversion on the residuals of the attribute values of the point cloud.

Encoding the residuals of the attribute values of the point cloud may include:

encoding the residuals of the attribute values of the point cloud according to the attribute values after the sign conversion.

Optionally, the constant value may be 1.

Optionally, the value of the syntax element may be configured to a constant value not less than the constant value.

In the present embodiment of the present disclosure, by fixing the search range to the value not less than the constant value, the solutions with the search range less than or equal to the constant value may be removed, including the solution of removing the direct binary encoding of the attribute values of the point cloud itself. Further, when encoding the value of the syntax element indicating the value of the search range, the difference value after subtracting the constant value from the value of the syntax element may be written into the code stream. Through this implementation, the algorithm complexity of encoding the attribute values may be greatly simplified and reduced. Time overhead and the efficiency of attribute encoding may be improved. Also, the number of bits occupied by the syntax element may be reduced in some cases.

Figure 6:
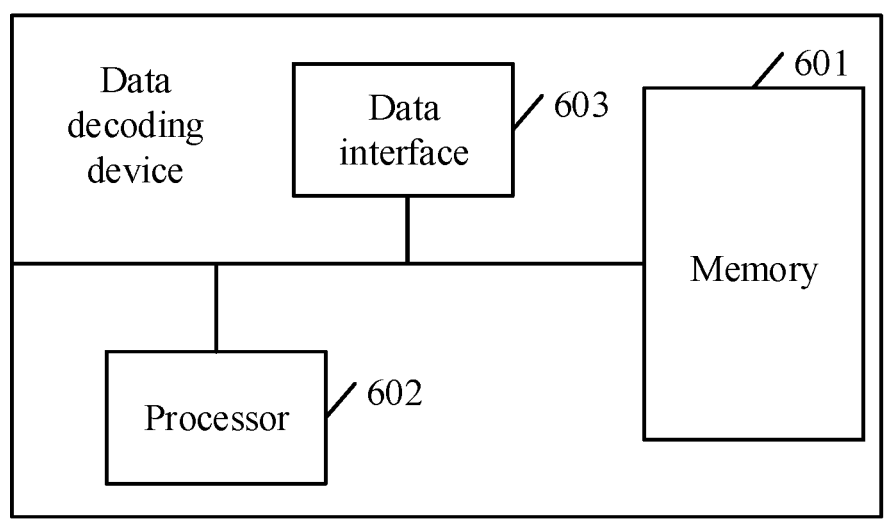
FIG. 6 is a schematic block diagram of a data decoding device consistent with the present disclosure.

The present disclosure also provides a data decoding device. In one embodiment shown in FIG. 6, the data decoding device includes a memory 601, a processor 602, and a data interface 603.

The memory 601 may include a volatile memory. The memory 601 may also include a non-volatile memory. The memory 601 may also include a combination of a volatile memory or a non-volatile memory. The processor 602 may be a central processing unit (CPU). The processor 602 may further include a hardware data encoding device. The hardware data encoding device may be an application-specific integrated circuit (ASIC), a programmable logic device (PLD), or a combination thereof. For example, it may be a complex programmable logic device (CPLD), a field-programmable gate array (FPGA), or any combination thereof.

The memory 601 may be configured to store programs. When the programs are executed, the processor 602 may be configured to call the programs stored in the memory 601 to:

decode a value of a syntax element of point cloud data from code stream data, where the point cloud data includes attribute values of the point cloud, and the syntax element is used to indicate a search range of the attribute values of the point cloud during prediction decoding;

determine the search range of the attribute values of the point cloud during prediction encoding according to a sum of the value of the syntax element and a constant value, where the constant value is a positive number;

obtain residuals of the attribute values of the point cloud from the code stream data by decoding; and perform compensation processing on the residuals of the attribute values of the point cloud according to the search range.

Optionally, the point cloud data may further include position coordinates of the point cloud.

Before performing compensation processing on the residuals of the attribute values of the point cloud, the processor may be further configured to:

calculate sorting code corresponding to the position coordinates of the point cloud points in the point cloud; and sort the point cloud points in the point cloud according to the sorting code of the point cloud points in the point cloud.

Performing compensation processing on the residuals of the attribute values of the point cloud according to the above search range may include:

performing compensation processing on the residuals of the attribute values of the point cloud according to the order of the point cloud points in the point cloud and the search range.

Optionally, perform compensation processing on the residuals of the attribute values of the point cloud according to the order of the point cloud points in the point cloud and the search range may include:

determining a reference point cloud point of a current point cloud point according to the search range, where an order difference between the reference point cloud point and the current point cloud point in the sorted point cloud is not greater than the search range; and determining the attribute value of the current point cloud point according to the residual of the attribute value of the current point cloud point and the attribute value of the reference point cloud point.

Optionally, the code stream data may include a first identifier, and the first identifier may be used to indicate a number of point cloud points consecutively having a residual of attribute value of 0.

Optionally, the identification information may include a second identifier, and the second identifier may be used to indicate whether the residual of the attribute value of the current point cloud point is n, where n is a positive integer. Optionally, n may be 1 or 2.

Optionally, the second identifier may be specifically used to indicate whether the difference between the residual of the attribute value of the current point cloud point and n is zero.

Optionally, before performing compensation processing on the residuals of the attribute values of the point cloud according to the order of the point cloud points in the point cloud and the search range, the processor may be further configured to:

perform sign conversion on the residuals of the attribute values of the point cloud.

Performing compensation processing on the residuals of the attribute values of the point cloud according to the order of the point cloud points in the point cloud and the search range may include:

performing compensation processing on the residuals of the attribute values of the point cloud after the sign conversion according to the search range.

Optionally, the constant value may be 1.

Optionally, the value of the syntax element may be configured to a constant value not less than the constant value.

In the present embodiment of the present disclosure, by fixing the search range to the value not less than the constant value, the solutions with the search range less than or equal to the constant value may be removed, including the solution of removing the direct binary encoding of the attribute values of the point cloud itself. Further, when encoding the value of the syntax element indicating the value of the search range, the difference value after subtracting the constant value from the value of the syntax element may be written into the code stream. Through this implementation, the algorithm complexity of encoding the attribute values may be greatly simplified and reduced. Time overhead and the efficiency of attribute encoding may be improved. Also, the number of bits occupied by the syntax element may be reduced in some cases.

The present disclosure also provides a computer-readable storage medium. The computer-readable storage medium may be configured to store a computer program. When the computer program is executed by a processor, the data encoding method provided by various embodiments of the present disclosure shown in FIG. 3, or the data decoding method provided by various embodiments of the present disclosure shown in FIG. 4, or the data encoding device provided by various embodiments of the present disclosure shown in FIG. 6, or the data decoding device provided by various embodiments of the present disclosure shown in FIG. 6 may be implemented, which will not be repeated here.

The computer-readable storage medium may be an internal storage unit of the device described in any of the foregoing embodiments of the present disclosure, such as a hard disk or a memory of the device. The computer-readable storage medium may also be an external storage device of the device, such as a plug-in hard disk equipped on the device, a smart memory card (SMC), a secure digital card (SD), or a flash card, etc. Further, the computer-readable storage medium may also include both an internal storage unit of the device and an external storage device. The computer-readable storage medium may be used to store the computer program and other programs and data required by the device. The computer-readable storage medium may also be used to temporarily store data that has been output or will be output.

A person of ordinary skill in the art can be aware that the units and algorithm steps described in the embodiments disclosed herein can be implemented by electronic hardware, computer software, or a combination of both. To clearly illustrate the hardware and software interchangeability, in the above description, the composition and steps of each example have been generally described in accordance with the function. Whether these functions are executed by hardware or software depends on the specific application and design constraint conditions of the technical solution. Professionals and technicians can use different methods for each specific application to implement the described functions, but such implementation should not be considered as being beyond the scope of the present disclosure.

Those skilled in the art can clearly understand that, for the convenience and conciseness of description, the specific working processes of the above-described system, device, and unit is not repeated, and reference can be made to the corresponding processes described in the foregoing method embodiments.

In the embodiments provided in the present disclosure, it should be understood that the disclosed system, device, and method may be implemented in other ways. For example, the device embodiments described above are only illustrative. For example, the division of the units is only a logical function division, and there may be other divisions in actual implementation. For example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, and may also be electrical, mechanical or other forms of connection.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments of the present disclosure.

In addition, the functional units in the various embodiments of the present disclosure may be integrated into one processing unit, or each unit may exist alone physically, or two or more units may be integrated into one unit. The above-mentioned integrated unit can be implemented in the form of hardware or software functional unit.

When the integrated unit is implemented in the form of a software functional unit and sold or used as an independent product, it can be stored in a computer readable storage medium. Based on this understanding, all or part of the technical solution can be embodied in the form of a software product. The computer software product is stored in a storage medium, and includes several instructions to enable a computer device (which may be a personal computer, a server, or a network device, etc.) to perform all or part of the steps of the method described in each embodiment of the present disclosure. The aforementioned storage medium includes: a U disk, a mobile hard disk, a read-only memory (ROM), a random access memory (RAM), a magnetic disk, an optical disk, or another medium that can store program codes.

The above are only specific implementations of embodiments of the present disclosure, but the scope of the present disclosure is not limited to this. Anyone familiar with the technical field can easily think of various equivalents within the technical scope disclosed in the present disclosure. These modifications or replacements shall be covered within the scope of the present disclosure. Therefore, the protection scope of the present disclosure shall be subject to the protection scope of the claims.

What is claimed is:

1. A data encoding method comprising:
   determining a value of a syntax element of point cloud data of a point cloud, the point cloud data including attribute values of the point cloud and the syntax element indicating a search range of the attribute values during prediction encoding;
   performing prediction processing on the attribute values according to the search range, to obtain residuals of the attribute values; and
   encoding the residuals and a difference between the value of the syntax element and a constant value, to generate code stream data, the constant value being 1.

2. The method according to claim 1,
wherein the point cloud data further includes position coordinates of the point cloud;
the method further comprising, before performing prediction processing on the attribute values:
calculating sorting codes corresponding to the position coordinates of point cloud points in the point cloud; and
sorting the point cloud points according to the sorting codes;
wherein performing prediction processing on the attribute values includes:
performing prediction processing on the attribute values according to an order of the point cloud points and the search range.

3. The method according to claim 2, wherein performing prediction processing on the attribute values according to the order of the point cloud points and the search range includes:
determining a reference point cloud point of a current point cloud point, an order difference between the reference point cloud point and the current point cloud point in the sorted point cloud being not greater than the search range; and
calculating the residual of the attribute value of the current point cloud point according to the attribute value of the reference point cloud point and the attribute value of the current point cloud point.

4. The method according to claim 1, wherein the code stream data includes an identifier indicating a number of consecutive point cloud points having the residual of 0.

5. The method according to claim 1, wherein the code stream data includes an identifier indicating whether the residual of the attribute value of the current point cloud point is n, n being a positive integer.

6. The method according to claim 5, wherein n is 1 or 2.

7. The method according to claim 5, wherein the identifier indicates whether a difference between the residual of the attribute value of the current point cloud point and n is zero.

8. The method according to claim 1, further comprising, before encoding the residuals:
performing sign conversion on the residuals;
wherein encoding the residuals includes encoding the residuals according to the attribute values after the sign conversion.

9. The method according to claim 1, wherein the value of the syntax element is fixed to be not less than the constant value.

10. A data decoding method comprising:
decoding code stream data to obtain a decoded value of a syntax element of point cloud data of a point cloud, the point cloud data including attribute values of the point cloud, and the syntax element indicating a search range of the attribute values during prediction decoding;
determining the search range of the attribute values during prediction encoding according to a sum of the decoded value of the syntax element and a constant value, the constant value being 1;
obtaining residuals of the attribute values from the code stream data by decoding; and
performing compensation processing on the residuals according to the search range.

11. The method according to claim 10,
wherein the point cloud data further includes position coordinates of the point cloud;
the method further comprising, before performing compensation processing on the residuals:
calculating sorting codes corresponding to the position coordinates of the point cloud points; and
sorting the point cloud points according to the sorting codes;
wherein performing compensation processing on the residuals includes performing compensation processing on the residuals according to an order of the point cloud points and the search range.

12. The method according to claim 11, wherein performing compensation processing on the residuals according to the order of the point cloud points and the search range includes:
determining a reference point cloud point of a current point cloud point according to the search range, an order difference between the reference point cloud point and the current point cloud point in the sorted point cloud is not greater than the search range; and
determining the attribute value of the current point cloud point according to the residual of the attribute value of the current point cloud point and the attribute value of the reference point cloud point.

13. The method according to claim 10, wherein the code stream data includes an identifier indicating a number of consecutive point cloud points having the residual of 0.

14. The method according to claim 10, wherein the code stream data includes an identifier indicating whether the residual of the attribute value of the current point cloud point is n, n being a positive integer.

15. The method according to claim 14, wherein n is 1 or 2.

16. The method according to claim 15, wherein the identifier indicates whether a difference between the residual of the attribute value of the current point cloud point and n is zero.

17. The method according to claim 10, further comprising, before performing compensation processing on the residuals:
performing sign conversion on the residuals;
wherein performing compensation processing on the residuals o according to the search range includes performing compensation processing on the residuals after the sign conversion according to the search range.

18. A data encoding device comprising:
a memory storing a program; and
a processor configured to execute the program to:
determine a value of a syntax element of point cloud data of a point cloud, the point cloud data including attribute values of the point cloud and the syntax element indicating a search range of the attribute values during prediction encoding;
perform prediction processing on the attribute values according to the search range, to obtain residuals of the attribute values; and
encode the residuals and a difference between the value of the syntax element and a constant value, to generate code stream data, the constant value being 1.

* * * * *